United States Patent [19]

Spray

[11] Patent Number: 5,048,469
[45] Date of Patent: Sep. 17, 1991

[54] INTERNAL COMBUSTION ENGINE INLET MANIFOLD

[75] Inventor: Richard H. Spray, Studley, England

[73] Assignee: Rover Group Limited, United Kingdom

[21] Appl. No.: 626,619

[22] Filed: Dec. 7, 1990

[30] Foreign Application Priority Data

Dec. 12, 1989 [GB] United Kingdom ............... 8928044

[51] Int. Cl.⁵ ............................................. F02M 35/10
[52] U.S. Cl. ............................................. 123/52 MB
[58] Field of Search ......... 123/52 M, 52 MB, 52 MV, 123/52 MC

[56] References Cited

U.S. PATENT DOCUMENTS

| 4,619,226 | 10/1986 | Ueda et al. | 123/52 MB |
| 4,671,217 | 6/1987 | Hitomi et al. | 123/52 MB |
| 4,819,588 | 4/1989 | Itoh et al. | |
| 4,932,369 | 6/1990 | Parr | 123/52 MB |

FOREIGN PATENT DOCUMENTS

| 0182223 | 5/1986 | European Pat. Off. | |
| 0052651 | 3/1982 | Japan | 123/52 MB |

OTHER PUBLICATIONS

Patent Abstracts of Japan, vol. 8, No. 154 (M-310), Jul. 18, 1984, & JP-A-59 050849 (Nitsushin Kogyo K.K.), Mar. 24, 1984.

*Primary Examiner*—David A. Okonsky
*Attorney, Agent, or Firm*—Davis, Bujold & Streck

[57] ABSTRACT

An internal combustion engine inlet manifold comprises upper and lower castings which together define a plenum and a vacuum reservoir separated by a common dividing wall. Inlet tracts connect the plenum to an engine to be supplied with air and an inlet port connects the plenum to atmosphere through a variable throttle. The reservoir includes an outlet port for connection of the reservoir to a device requiring a source of vacuum and is connected to the plenum by means of a one way flow valve operable to permit the egress of air from the reservoir when the pressure in the plenum is lower than that subsisting in the reservoir but to prevent the flow of air from the plenum to the reservoir when the pressure in the plenum is higher than that subsisting in the reservoir.

6 Claims, 3 Drawing Sheets

INTERNAL COMBUSTION ENGINE INLET MANIFOLD

This invention relates to an internal combustion engine and in particular to an inlet manifold therefor.

It is well known to provide an inlet manifold for an engine having a plenum and a like number of inlet tracts connected to said plenum as there are cylinders in the engine to which the inlet manifold is connected. It is further known to use the plenum as a source of vacuum for a brake servo and other vehicle control systems. Such prior art arrangements employ a large tank mounted on the vehicle and connected to the plenum via flexible hose.

With the increasing complexity of motor vehicles the amount of available space in the engine compartment is reducing.

Furthermore, there is an increasing demand to keep the engine compartment height to a minimum in order to improve aerodynamic efficiency of the motor vehicle.

In combination these two effects mean that it is becoming increasingly difficult to find sufficient space to mount a large vacuum tank.

It is an object of the invention to overcome the problems associated with the prior art.

According to the invention there is provided an internal combustion engine inlet manifold comprising a housing defining a plenum, at least one inlet tract connected to and extending from the plenum for connection to an engine to be supplied with air and an inlet port to connect the plenum to atmosphere through a variable throttle, wherein the housing further defines a vacuum reservoir separated from the plenum by a common dividing wall and having an outlet port for connection of the reservoir to a device requiring a source of vacuum and a one way flow valve is operable to permit the egress of air from the reservoir when the pressure in the plenum is lower than that subsisting in the reservoir but to prevent the flow of air from the plenum to the reservoir when the pressure in the plenum is higher than that subsisting in the reservoir.

Preferably, the one way flow valve is mounted in said dividing wall.

Advantageously, the or each inlet tract has a wall portion which is common to a wall portion of the reservoir.

The housing may be cast in an aluminum alloy material.

The or each inlet tract may be curved in an arc encircling part of said reservoir.

The one way valve means may be press fitted into an aperture in said dividing wall and a plug may be fitted into a wall of the plenum to provide access to said one way valve means.

The invention will now be described by way of example with reference to the accompanying drawings in which.

Figure 1:
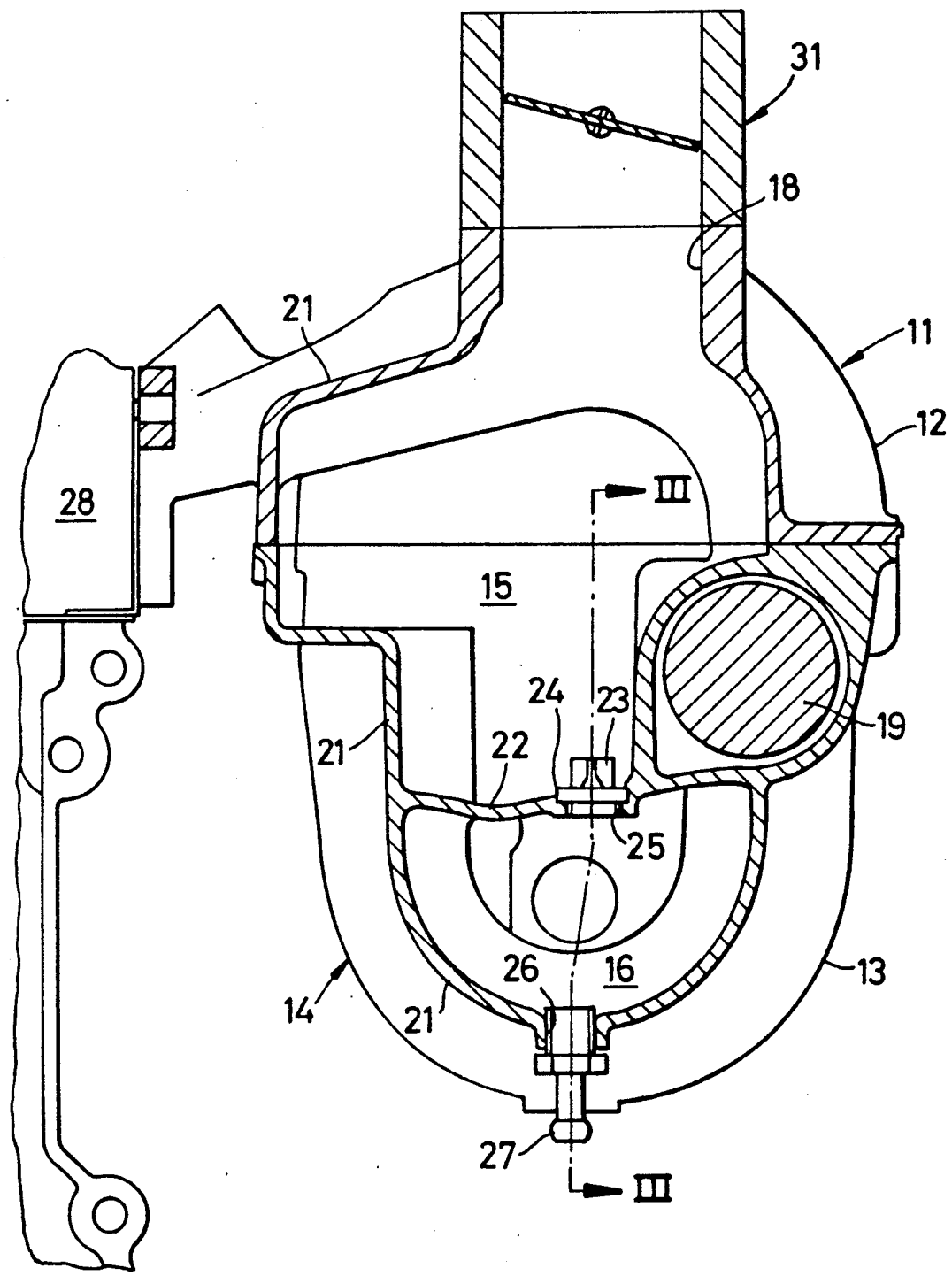
FIG. 1 is a transverse cross-section through an inlet manifold according to the invention and includes a section on the line I—I in FIG. 3.

An internal combustion engine inlet manifold 11 is formed by an upper casting 12 and a lower casting 13 both of aluminium and which together form a housing 14 which defines a plenum 15 and a vacuum reservoir 16, four curved inlet tracts 17 and an inlet port 18.

Figure 2:
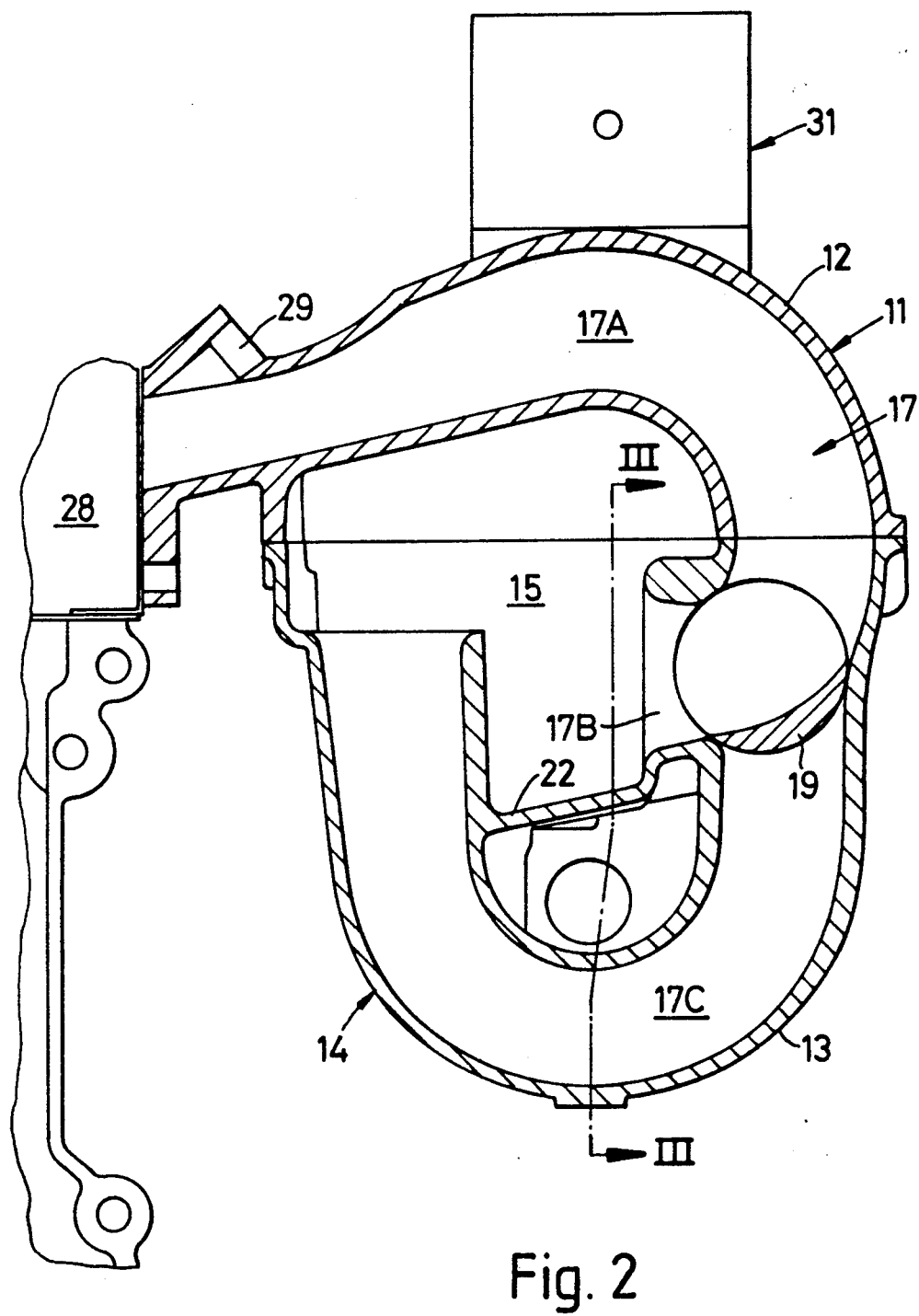
FIG. 2 is a transverse cross-section through the inlet manifold shown in FIG. 1 taken on another plane and includes a section on the line II—II FIG. 3.
Figure 3:
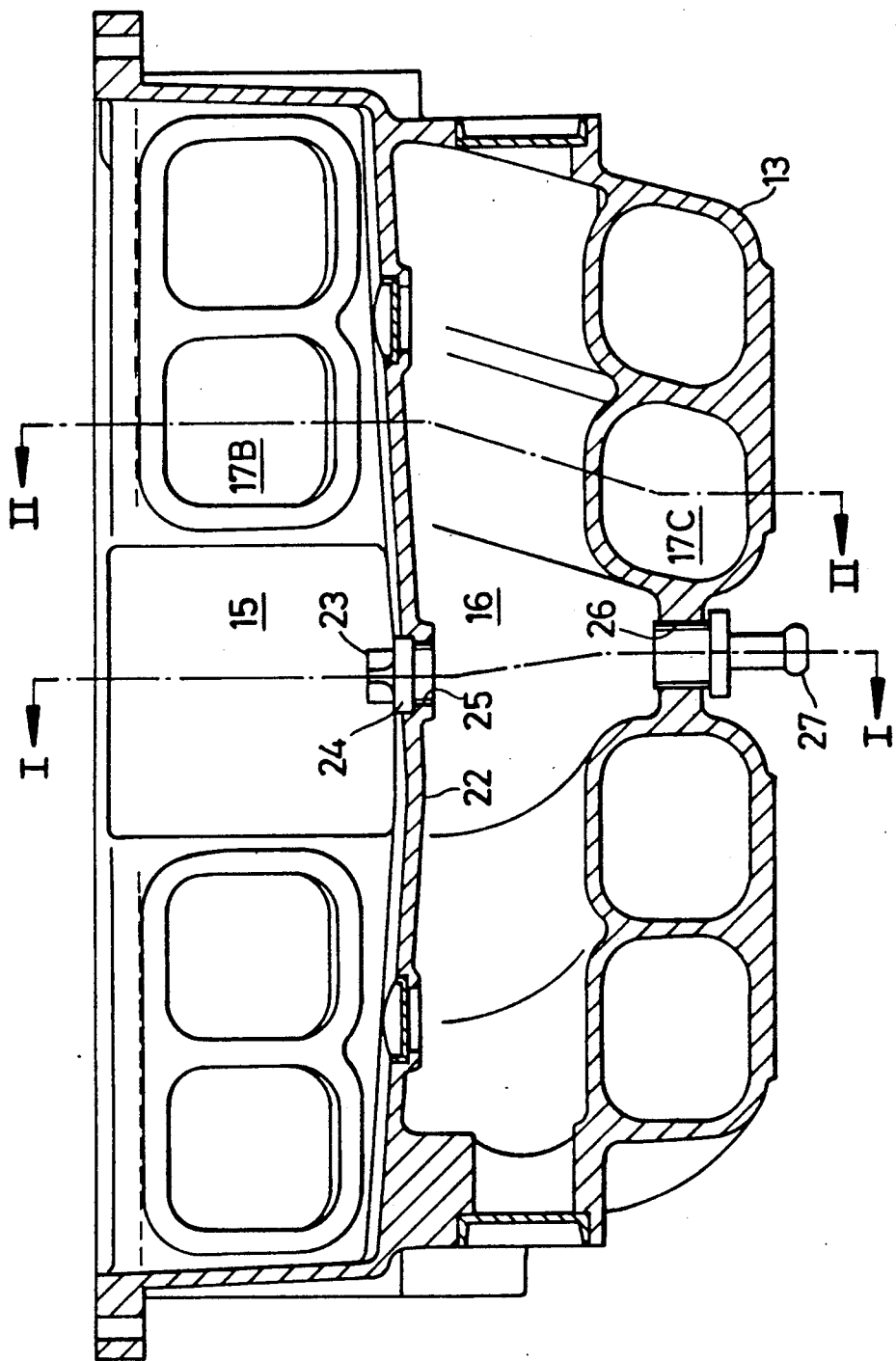
FIG. 3 is a cross-section on the line II—II in FIG. 1 and FIG. 2.

The inlet manifold 11 is similar in construction to that described in US-A-4932369 and includes a rotary valve member 19 which is operable to switch the length of each inlet tract 17 between a short length comprising a respective upper portion 17A defined principally by the upper casting 12 and a respective bellmouth portion 17B and a longer length comprising the respective upper portion 17A and a respective u-shaped portion 17C. In FIG. 2 the rotary valve member 19 is set to provide the short inlet tract comprising portions 17A and 17B.

Each bellmouth portion 17B and each u-shaped portion 17C open into the plenum 15. The plenum 15 is formed by extending webs 21 between the walls of the inlet tracts 17 in both the upper and lower castings 12 and 13 and by putting a dividing wall 22 in the lower casting 13. There is a leakproof joint face where the upper and lower castings abut.

The vacuum reservoir 16 is formed below the dividing wall 22 in the lower casting 13 by conventional coring techniques so as to be bounded by the dividing wall, the webs 21 and part of the inner walls of the inlet tract portions 17C which are each curved in an arc to encircle part of the reservoir.

Core plugs are used to seal unwanted core holes. However, one core hole 25 is machined to take a one-way or check valve 23 of the slit cruciform type which is retained by a push-fit collar 24. Another core hole 26 acts as an outlet port, being machined to take a hose fitting 27 for connecting the vacuum reservoir 16 to a device requiring a source of vacuum.

In use the inlet manifold is fastened to the cylinder head 28 of an internal combustion engine so that the tracts 17 are aligned with the inlet ports in the cylinder head. Apertures 29 are provided in the upper casting for fuel injection nozzles (not shown). To maintain a desired fuel to air ratio a variable throttle 31 is mounted on the manifold to restrict the flow of atmospheric air through the inlet port from an air filter.

As is well known, the variable throttle 31 creates a sub-atmospheric pressure or partial vacuum in the plenum 15 (often called the manifold depression), the lowest pressure being when the throttle 31 is closed.

The check valve 23 allows air in the vacuum reservoir 16 to be exhausted into the plenum 15 whenever the plenum pressure is lower than that in the vacuum reservoir. If plenum pressure rises (eg at open throttle), the check valve 23 keeps the vacuum reservoir at sub-atmospheric pressure and control systems connected to the fitting 27 continue to function.

The inventions is particularly useful in providing a reservoir for a control system used to operate the rotary valve member 19 by means of a diaphragm type actuator. Although the invention has been described with respect to an inlet manifold made by casting in an aluminium alloy it will be appreciated that the inlet manifold could be formed from a plastics material or could be cast as a single component.

Similarly, the one way valve could be located in an external duct connecting the plenum to the reservoir.

I CLAIM:

1. An internal combustion engine inlet manifold comprising a housing defining a plenum and a vacuum reservoir separated by a common dividing wall, an inlet tract connected to and extending from the plenum for connection to an engine to be supplied with air and an inlet port to connect the plenum to atmosphere through a variable throttle, the reservoir having an outlet port for connection of the reservoir to a device requiring a source of vacuum, and a one way flow valve operable to permit the egress of air from said reservoir when the pressure in the plenum is lower than that subsisting in the reservoir but to prevent the flow of air from the plenum to the reservoir when the pressure in the plenum is higher than that subsisting in the reservoir.

2. An inlet manifold as claimed in claim 1 in which the one way flow valve is mounted in said dividing wall.

3. An inlet manifold as claimed in claim 1 in which the inlet tract has a wall portion which is common to a wall portion of the reservoir.

4. An inlet manifold as claimed in claim 1 in which the housing is cast in an aluminium alloy material.

5. An inlet manifold as claimed in claim 1 in which the inlet tract is a curved inlet tract defining an arc encircling part of said reservoir.

6. An inlet manifold as claimed in claim 1 further comprising a valve member operable to vary the length of the or each inlet tract and arranged to be actuated by vacuum from said reservoir.

* * * * *